(12) United States Patent
Robertson

(10) Patent No.: US 9,896,949 B2
(45) Date of Patent: Feb. 20, 2018

(54) BONDED FAN PLATFORM

(71) Applicant: United Technologies Corporation, Hartford, CT (US)

(72) Inventor: Thomas J. Robertson, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 586 days.

(21) Appl. No.: 14/862,390

(22) Filed: Sep. 23, 2015

(65) Prior Publication Data

US 2016/0177754 A1 Jun. 23, 2016

Related U.S. Application Data

(60) Provisional application No. 62/095,962, filed on Dec. 23, 2014.

(51) Int. Cl.
*F01D 5/14* (2006.01)
*F01D 5/30* (2006.01)
(Continued)

(52) U.S. Cl.
CPC ............ *F01D 5/3069* (2013.01); *F01D 5/12* (2013.01); *F01D 5/147* (2013.01); *F01D 5/3053* (2013.01); *F04D 29/023* (2013.01); *F04D 29/324* (2013.01); *F01D 5/282* (2013.01); *F01D 11/008* (2013.01); *F02K 3/06* (2013.01); *F05D 2220/36* (2013.01); *F05D 2240/80* (2013.01); *F05D 2240/81* (2013.01); *F05D 2260/30* (2013.01);
(Continued)

(58) Field of Classification Search
CPC .... F01D 5/147; F01D 11/005; F05D 2240/80; F05D 2240/55; F04D 29/388
USPC .................................................... 156/64, 379
See application file for complete search history.

(56) References Cited

U.S. PATENT DOCUMENTS 4,019,832 A * 4/1977 Salemme .................. F01D 5/30
416/135
5,362,120 A * 11/1994 Cornille, Jr. ......... B62D 27/026
156/295
(Continued)

FOREIGN PATENT DOCUMENTS

WO 2013185044 12/2013

OTHER PUBLICATIONS

Extended European Search Report dated Sep. 13, 2016 in European Application No. 15201383.5.

*Primary Examiner* — Ninh H Nguyen
(74) *Attorney, Agent, or Firm* — Snell & Wilmer, L.L.P.

(57) ABSTRACT

A fan is provided. The fan may comprise a fan blade and a blade platform coupled to the fan blade. The blade platform may be a thermoplastic. A fan blade platform is also provided. The fan blade platform may comprise a first platform half comprising a slot at a first end of the first platform half and a first receiving member at a second end of the first platform half opposite the first end of the first platform half. A second platform half may comprise a hook. The second platform half may also include a second receiving member at a second end of the second platform half opposite the first end of the second platform half with the hook configured to interface with the slot. A pin may be configured to pass through the first receiving member and the second receiving member.

17 Claims, 8 Drawing Sheets

(51) Int. Cl.
    *F01D 5/12*     (2006.01)
    *F04D 29/02*     (2006.01)
    *F04D 29/32*     (2006.01)
    *F02K 3/06*     (2006.01)
    *F01D 5/28*     (2006.01)
    *F01D 11/00*     (2006.01)

(52) U.S. Cl.
    CPC .... *F05D 2260/36* (2013.01); *F05D 2300/603* (2013.01); *Y02T 50/676* (2013.01)

(56) References Cited

U.S. PATENT DOCUMENTS

| | | | |
|---|---|---|---|
| 5,957,658 A | 9/1999 | Kasprow et al. | |
| 6,217,283 B1* | 4/2001 | Ravenhall | F01D 5/225 |
| | | | 415/9 |
| 6,416,280 B1 | 7/2002 | Forrester et al. | |
| 8,529,208 B2* | 9/2013 | Brault | F01D 5/22 |
| | | | 416/191 |
| 2013/0330196 A1* | 12/2013 | Brown | F01D 5/147 |
| | | | 416/219 R |
| 2014/0086751 A1* | 3/2014 | Bottome | F01D 11/006 |
| | | | 416/193 R |

* cited by examiner

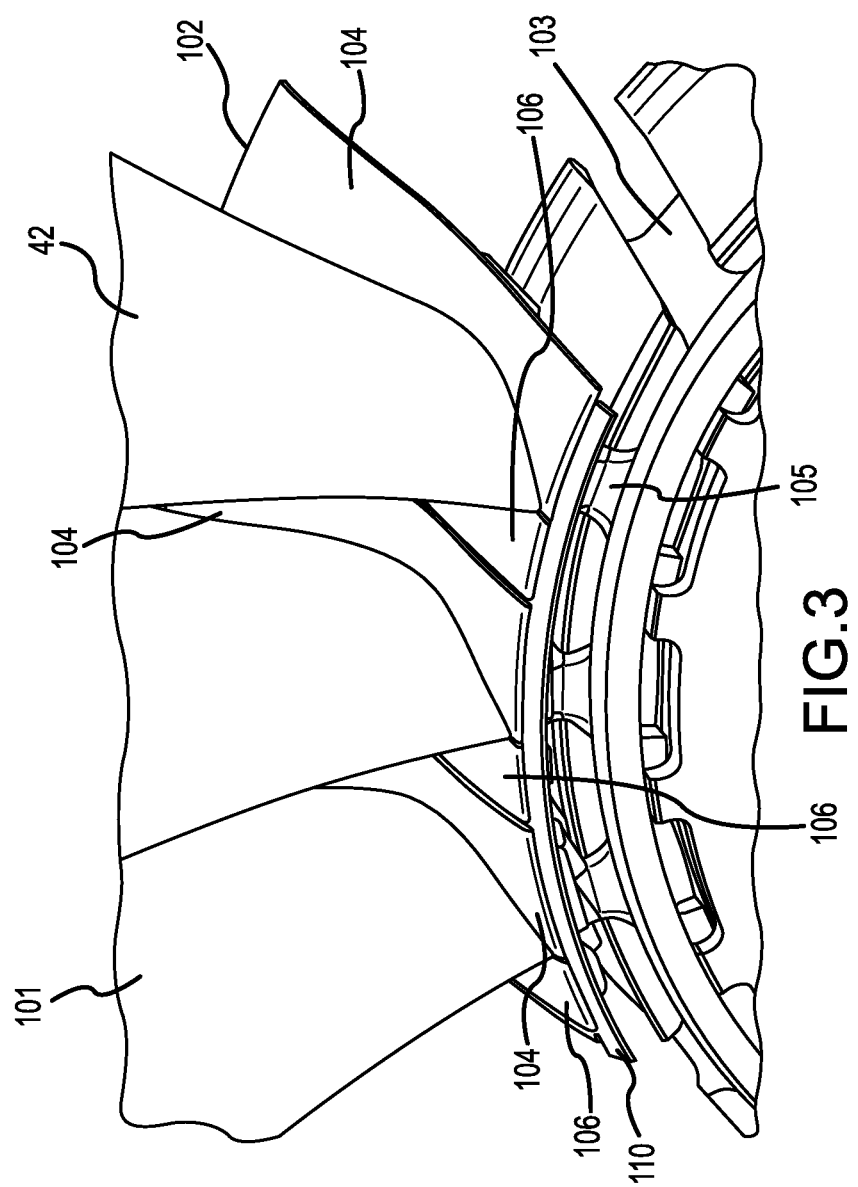

BONDED FAN PLATFORM

CROSS-REFERENCE TO RELATED APPLICATIONS

This application is a nonprovisional of, and claims priority to, and the benefit of U.S. Provisional Application No. 62/095,962, entitled "BONDED FAN PLATFORM," filed on Dec. 23, 2014, which is hereby incorporated by reference in its entirety.

FIELD OF INVENTION

The present disclosure relates to gas turbine engines, and, more specifically, to a bonded fan blade flowpath platform.

BACKGROUND

Some gas turbine engines include a fan section forward of the turbine section including fan blades. The fan blades may have spacers or platforms between blades at the inner flowpath. Integral metal platforms may add cost and weight to the gas turbine engine. Non-integral platforms secured to a fan hub frequently add weight and a cost to the gas turbine engine. Weight and cost are important considerations in the manufacturing of aircraft engines.

SUMMARY

A fan blade platform is provided. The blade platform may comprise a first platform half comprising a slot at a first end of the first platform half and a first receiving member at a second end of the first platform half opposite the first end of the first platform half. A second platform half may comprise a hook at a first end of the second platform half. The second platform half may also include a second receiving member at a second end of the second platform half opposite the first end of the first platform half with the hook configured to interface with the slot. A pin may be configured to pass through the first receiving member and the second receiving member.

In various embodiments, the fan blade platform may be made by injection molding or compression molding. The first platform half may have a mounting cavity. A bonding member may extend from the first platform half and have indicator openings. A seal may be bonded to an edge of the first platform half and/or the second platform half. The seal may include a tab configured to overlap with a neighboring seal. The seal may also be a fabric-reinforced silicone. Stiffening members may extend at an angle from a surface of the first platform half.

A gas turbine engine is also provided and comprises a fan section with a fan blade configured to rotate about an axis. A platform may be bonded to the fan blade using an adhesive paste and/or an adhesive film made from epoxy or other material. The fan blade may comprise a ridge configured to axially and/or radially secure the platform. A mounting member may be defined by the platform and follow a contour of the ridge. Indicator openings may be formed through the platform to indicate adhesive coverage between the platform and the fan blade. The platform may be made by injection molding or compression molding. The platform may comprise a first platform half and a second platform half. A hook may be formed on the first platform half. A slot may be formed on the second platform half and configured to engage the hook. A seal may be bonded to the platform. The platform may be a thermoplastic.

A fan is also provided. The fan may comprise a fan blade and a blade platform coupled to the fan blade. The blade platform may be a thermoplastic.

In various embodiments, the blade platform may be bonded to the fan blade using an adhesive paste, an epoxy, a glue and/or an adhesive film.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3 illustrates a fan having a molded platform bonded to the fan blades, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
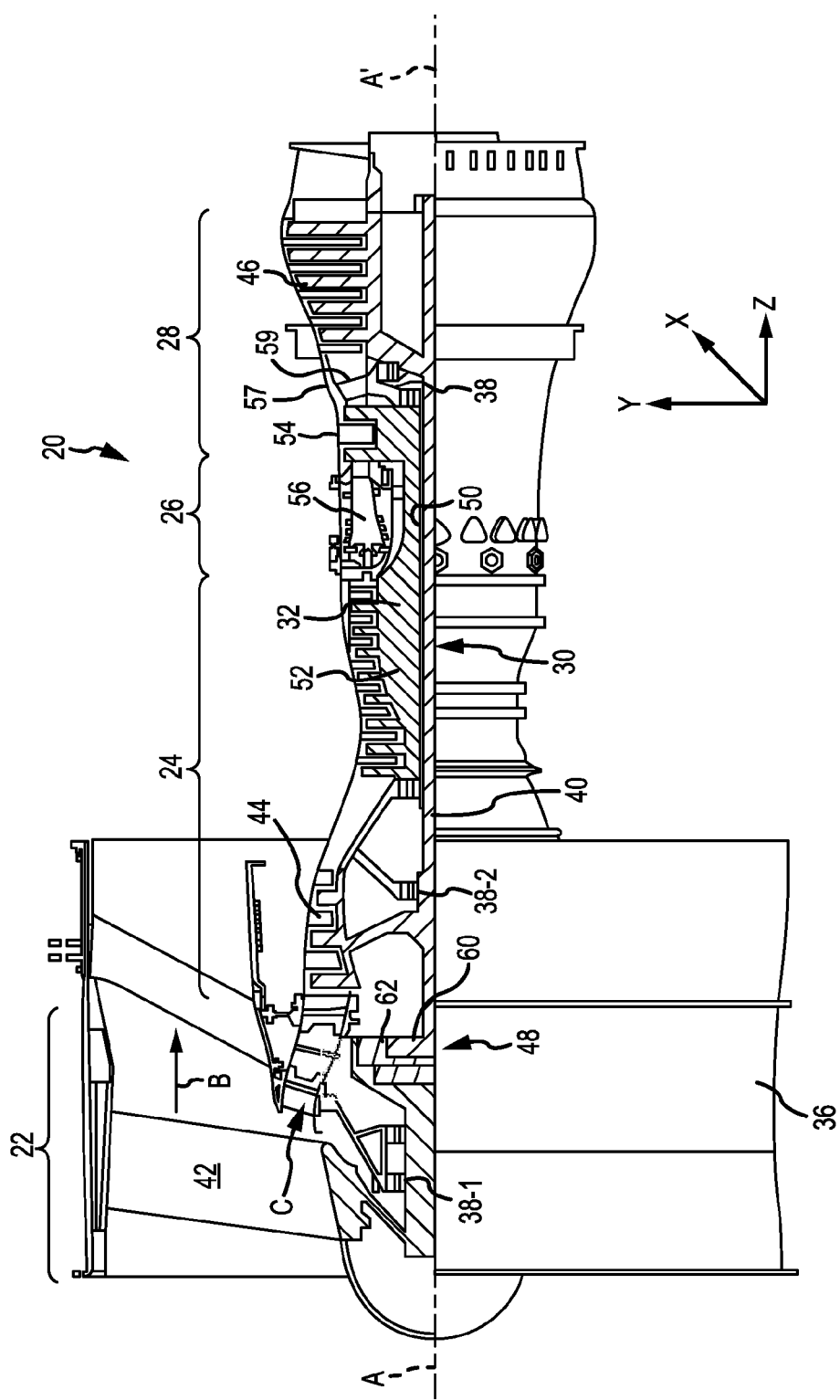
FIG. 1 illustrates an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
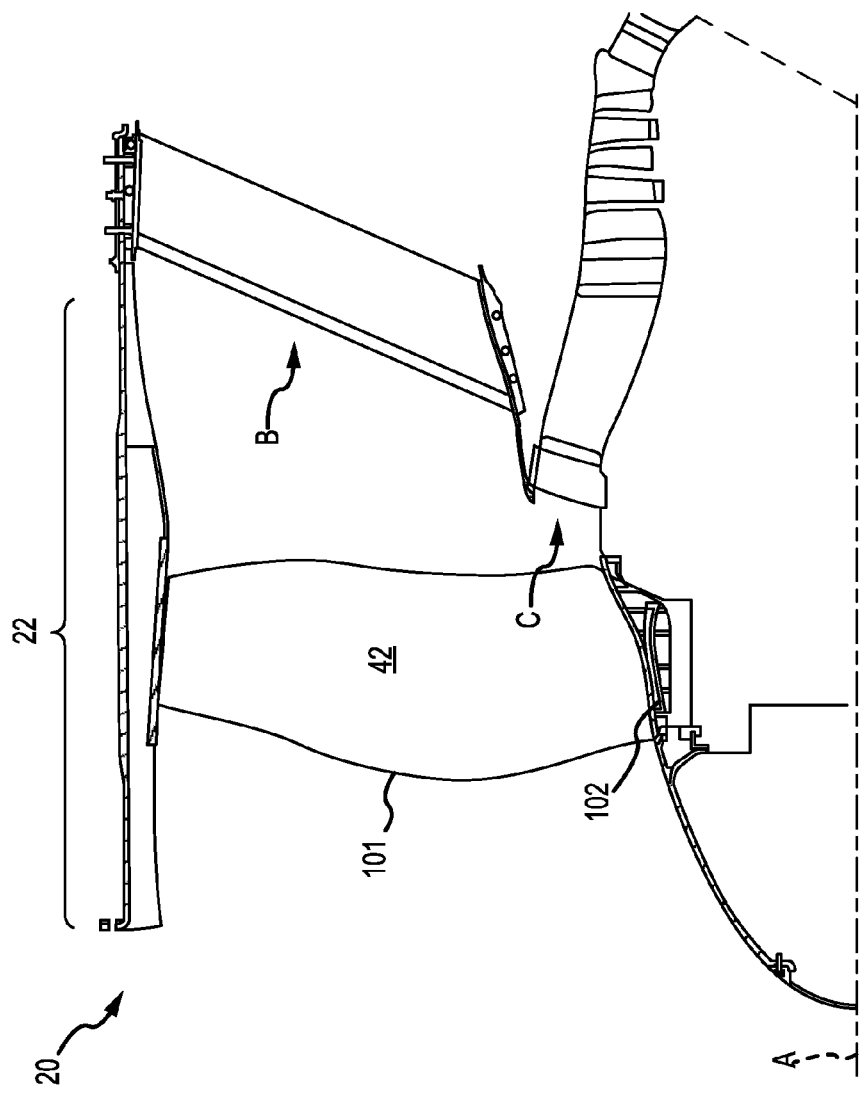
FIG. 2 illustrates a fan section of a gas turbine engine, in accordance with various embodiments.

With reference to FIG. 2, a fan section 22 of a gas turbine engine 20 is shown, in accordance with various embodiments. Fan 42 includes a plurality of fan blades 101. Each fan blade 101 may have a platform 102 coupled to the fan blade 101 at a proximal location. Platform 102 may form a portion of the proximal wall of core flow-path C. Fan blades 101 and platforms 102 may be spaced equally around engine central longitudinal axis A-A'.

With reference to FIG. 3, a perspective view of fan 42 having platform 102 bonded to fan blades 101 is shown, in accordance with various embodiments. A root 105 of each fan blade 101 engages walls of fan hub 103 to retain fan blade 101 during rotation. Platform 102 comprises a first platform half 104 and a second platform half 106.

Figure 4A:
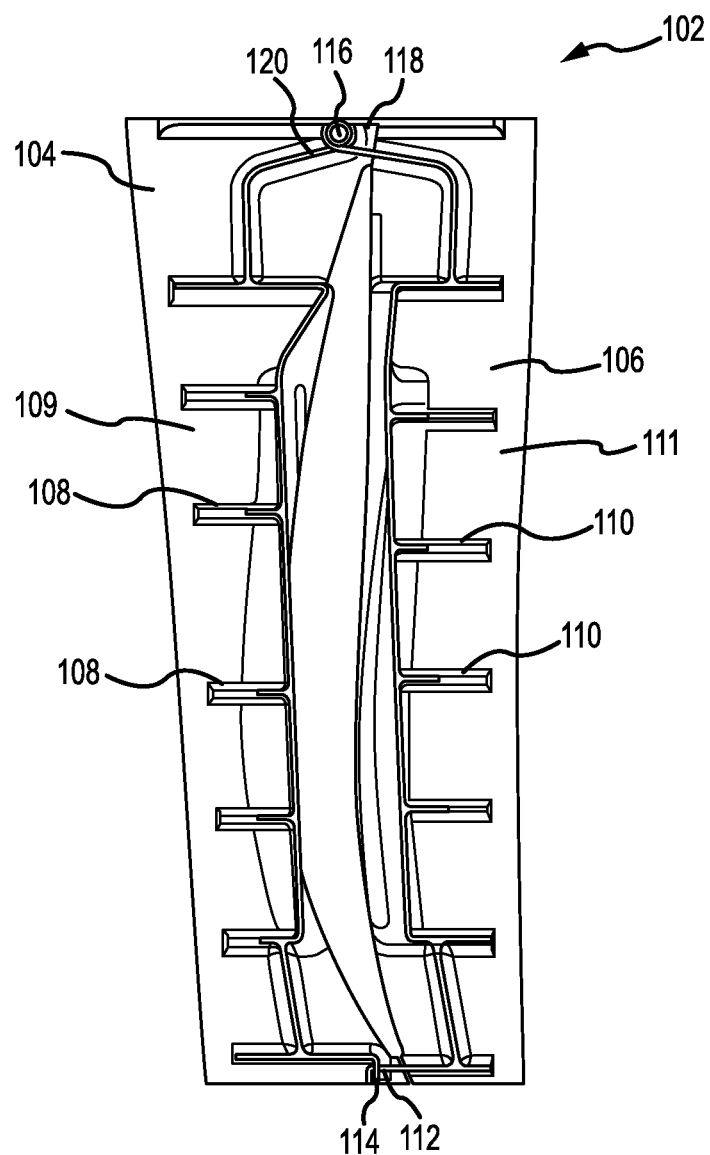
FIG. 4A illustrates a bottom view of a two-piece molded platform for a fan blade, in accordance with various embodiments.
Figure 4B:
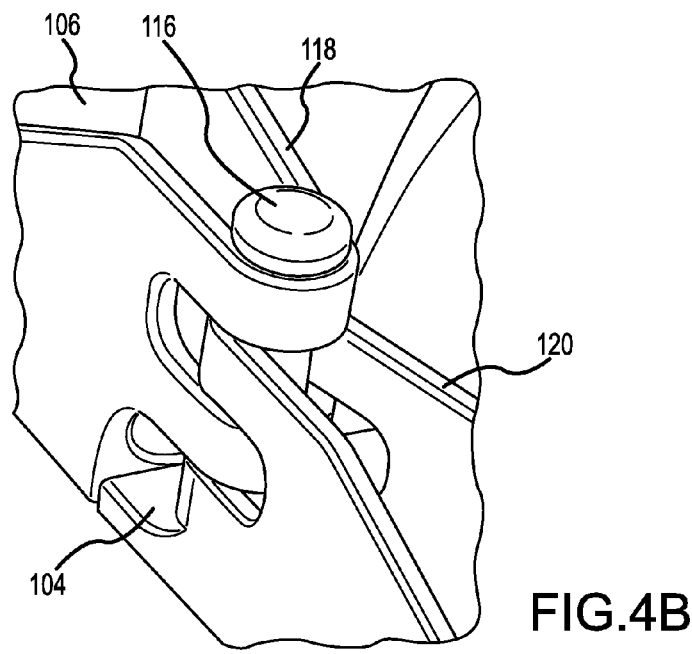
FIG. 4B illustrates a pin interface to interlock two pieces of a bonded platform, in accordance with various embodiments.
Figure 4C:
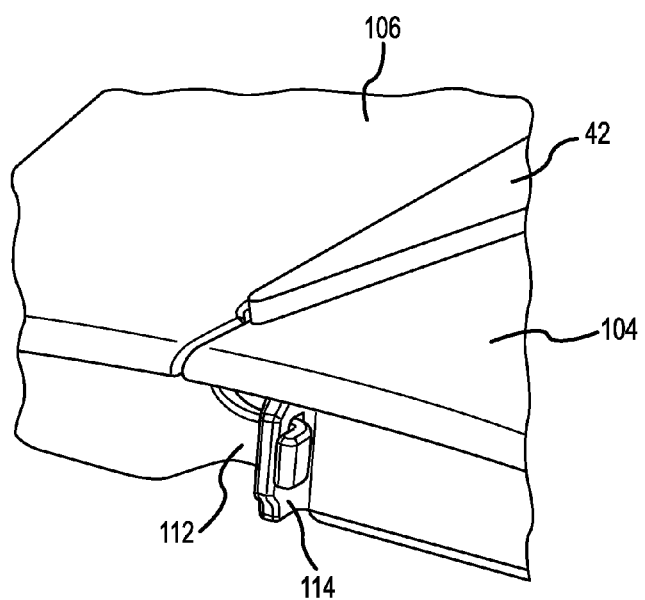
FIG. 4C illustrates a hook-and-slot interface to interlock two pieces of a bonded platform, in accordance with various embodiments.

With reference to FIGS. 4A through 4C, platform 102 is shown with first platform half 104 and second platform half 106 coupled together to form platform 102. First platform half 104 may include stiffening members 108 in the form of ridges formed on bottom surface 109 of first platform half 104. Second platform half 106 also includes stiffening members 110 in the form of ridges formed on the bottom surface 111 of second platform half 106. The stiffening members may provide rigidity for platform 102. First platform half 104 and second platform half 106 may both be made from moldable materials such as a carbon and/or glass reinforced thermoset or thermoplastic. The material may be compression molded using an autoclave or injection molded by injecting material into a mold. The materials may be low cost, low weight materials shaped using low cost techniques. In that regard, platform 102 may reduce the weight and cost of a gas turbine engine. Platform 102 may also be coated with an erosion coating (e.g., polyurethane).

In various embodiments, first platform half 104 may have a slot 114 configured to receive one or more hooks. Second platform half 106 may include a hook 112 configured to engage slot 114. With brief reference to FIG. 4C, first platform half 104 may also include a receiving member 120 and second platform half 106 may include receiving member 118 with the receiving members configured to receive one or more pins 116. When pin 116 is inserted through an opening defined by the overlap of receiving member 118 and receiving member 120, first platform half 104 and second platform half 106 may be mechanically coupled. In that regard, pin 116 and hook 112 may serve to attach first platform half 104 to second platform half 106 and form platform 102.

Figure 5A:
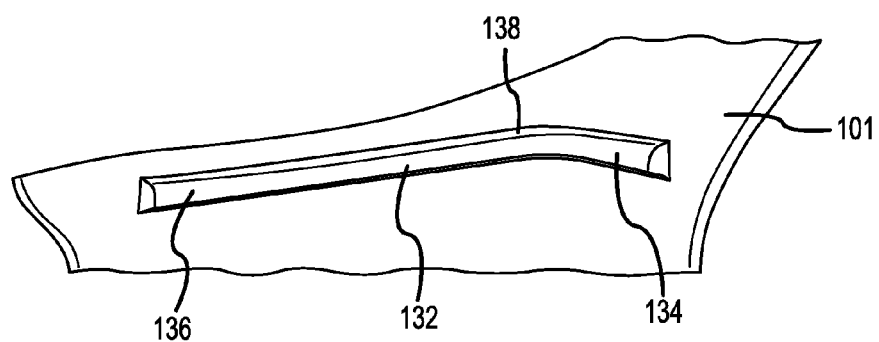
FIG. 5A illustrates a ridge formed on a fan blade to radially retain a bonded platform, in accordance with various embodiments.
Figure 5B:
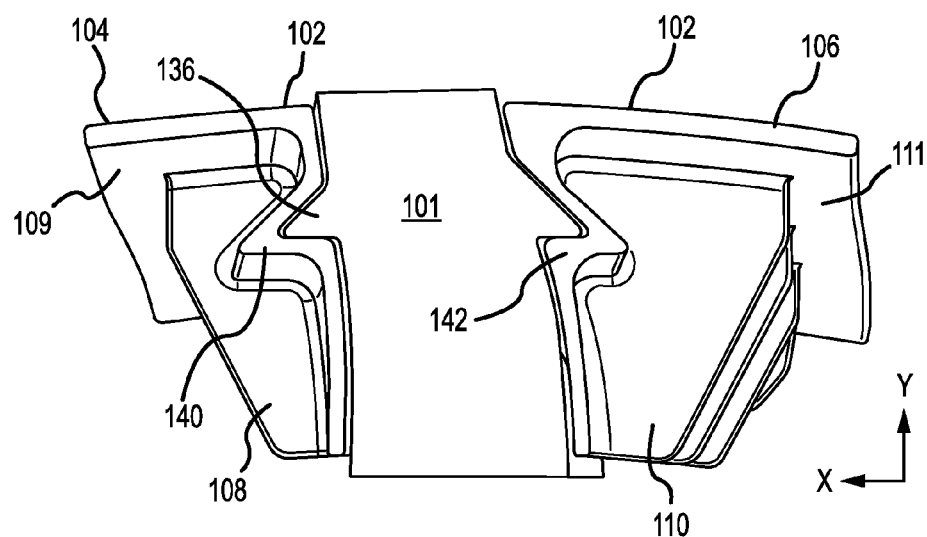
FIG. 5B illustrates a platform coupled to a fan blade and retained axially by a ridge, in accordance with various embodiments.

With reference to FIGS. 5A and 5B, a ridge formed on a fan blade to radially retain a bonded platform is shown, in accordance with various embodiments. A ridge 132 may be formed integrally with fan blade 101. Ridge 132 may include a forward segment 136 and an aft segment 134. Forward segment 136 may have a greater length than aft segment 134. Forward segment may also be tilted at an angle relative to aft segment 134 such that a kink 138 or elbow is formed between the segments. Forward segment 136 and aft segment 134 may thus provide retention for platform 102 in an axial direction (forward-to-aft direction).

In various embodiments, first platform half 104 and second platform half 106 of platform 102 may be coupled to fan blade 101 with mounting cavity 140 defined by first platform half 104 following a contour of ridge 132 and fan blade 101. Similarly, mounting cavity 142 is defined by second platform half 106 and may follow a contour of ridge 132 and fan blade 101. The mounting cavities mounted over ridge 132 provide resistance to retain platform 102 in the y direction. FIG. 5B also further illustrates that stiffening member 108 and stiffening members 110 extend at an angle from bottom surface 109 and bottom surface 111, respectively.

Figure 6A:
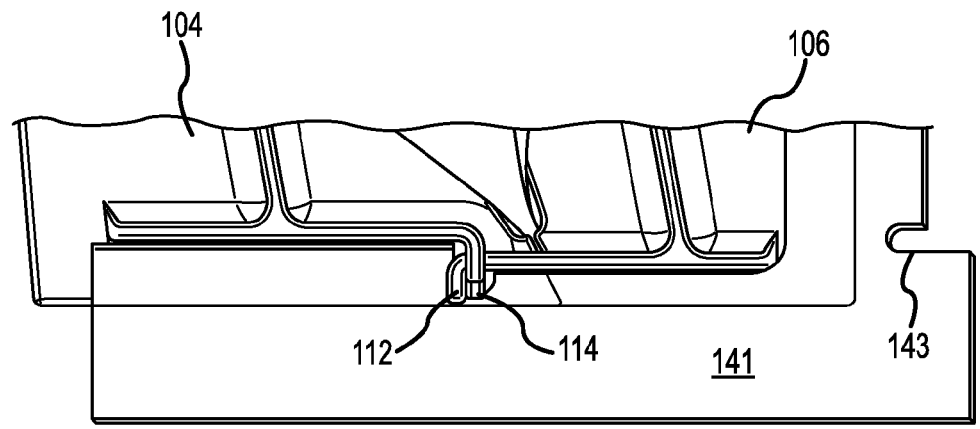
FIG. 6A illustrates a seal bonded to a two-piece blade platform, in accordance with various embodiments.
Figure 6B:
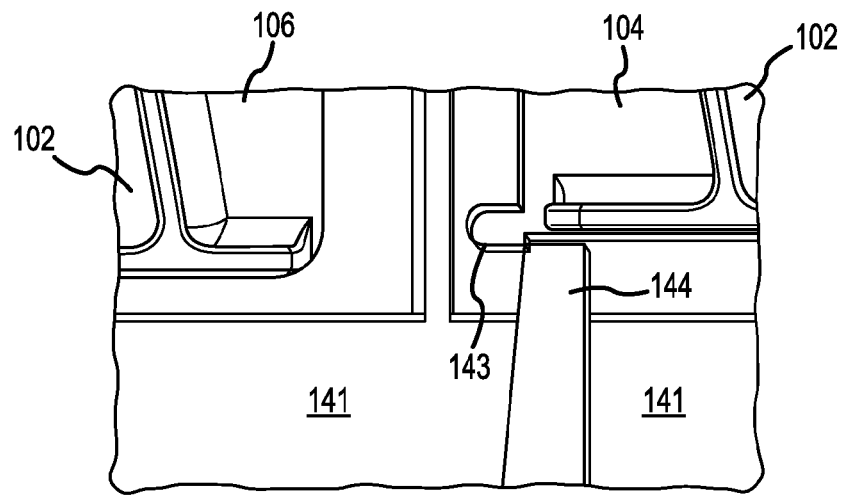
FIG. 6B illustrates overlap between adjacent seals bonded to adjacent blade platforms, in accordance with various embodiments.

With reference to FIGS. 6A and 6B, a seal 141 bonded to a platform 102 is shown, in accordance with various embodiments. Seal 141 may be glued, bonded, or otherwise coupled to platform 102 using, for example, a rubber adhesive or epoxy. Seal 141 may be made from a fabric-reinforced silicone, for example. Seal 141 may include a tab 143 to allow adjacent seals 141 to overlap. With reference to FIG. 6B, overlap 144 occurs when an edge of a first seal 141 is allowed to slide into tab 143 of neighboring second seal 141. Overlapping seals 141 may extend around a circumference of fan 42 of FIG. 2 to provide sealing between platforms 102.

Figure 7:
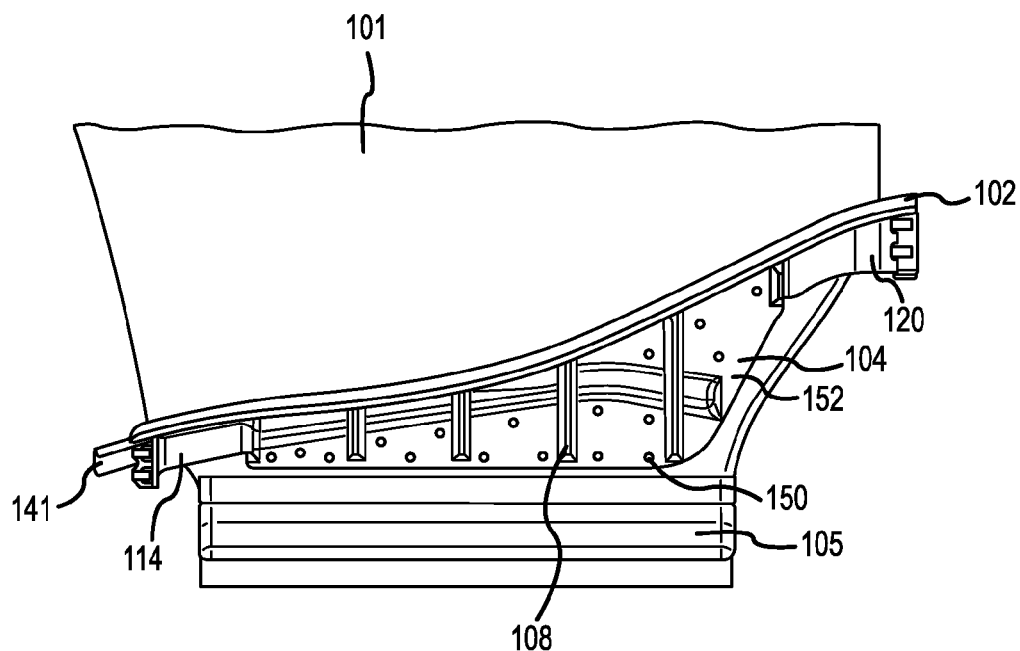
FIG. 7 illustrates a fan blade having a platform bonded to the fan blade, in accordance with various embodiments.

With reference to FIG. 7, a fan blade 101 having a platform 102 bonded to the fan blade 101 is shown, in accordance with various embodiments. Platform 102 may be bonded to fan blade 101 by applying an adhesive (e.g., an adhesive paste, epoxy, glue, and/or adhesive film) on the side of bonding member 152 adjacent fan blade 101. Platform 102 may be pressed against fan blade 101 with adhesive pressing through indicator openings 150 to indicate that adhesive coverage is good at the location of each indicator opening 150. Root 105 of fan blade 101 may extend from platform 102 to allow for installation in fan hub 103, as shown in FIG. 3. Platform 102 is bonded to fan blade 101 and may not rely on other fasteners to fix platform 102 to fan blade 101.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan blade platform, comprising:
a first platform half comprising a slot at a first end of the first platform half and a first receiving member at a second end of the first platform half opposite the first end of the first platform half;
a second platform half comprising a hook at a first end of the second platform half and a second receiving member at a second end of the second platform half opposite the first end of the second platform half, wherein the hook is configured to interface with the slot; and
a pin configured to pass through the first receiving member and the second receiving member.

2. The fan blade platform of claim 1, wherein the fan blade platform is made by injection molding or compression molding.

3. The fan blade platform of claim 1, wherein the first platform half includes a mounting cavity.

4. The fan blade platform of claim 1, further comprising a bonding member extending from the first platform half, the bonding member including indicator openings.

5. The fan blade platform of claim 1, further comprising a seal bonded to an edge of the first platform half and/or the second platform half.

6. The fan blade platform of claim 5, wherein the seal comprises a tab configured to overlap with a neighboring seal.

7. The fan blade platform of claim 5, wherein the seal further comprises a fabric-reinforced silicone.

8. The fan blade platform of claim 1, further comprising stiffening members extending from a surface of the first platform half.

9. A gas turbine engine, comprising:
a fan section comprising a fan blade configured to rotate about an axis;
a platform adhesively bonded to the fan blade using at least one of an adhesive paste or an adhesive film, wherein the platform comprises a first platform half and a second platform half;
a hook formed on the first platform half; and
a slot forming on the second platform half and configured to engage the hook.

10. The gas turbine engine of claim 9, wherein the fan blade comprises a ridge configured to secure the platform in at least one of an axial direction or a radial direction.

11. The gas turbine engine of claim 10, further comprising a mounting member defined by the platform and following a contour of the ridge.

12. The gas turbine engine of claim 9, further comprising indicator openings formed through the platform and configured to indicate adhesive coverage between the platform and the fan blade.

13. The gas turbine engine of claim 9, wherein the platform is injection molded or compression molded.

14. The gas turbine engine of claim 9, further comprising a seal bonded to the platform.

15. The gas turbine engine of claim 9, wherein the platform comprises at least one of a thermoplastic or a thermoset with carbon or fiber glass reinforcement.

16. A fan, comprising:
a fan blade; and
a blade platform bonded and mechanically locked to the fan blade, the blade platform comprising at least one of a thermoplastic or a thermoset with carbon or fiber glass reinforcement, wherein the blade platform comprises a first platform half and a second platform half;
a hook formed on the first platform half; and
a slot formed on the second platform half and configured to engage the hook.

17. The fan of claim 16, wherein the blade platform is bonded to the fan blade using at least one of an adhesive paste or an adhesive film.

* * * * *